J. D. KENNARD.
NUT-LOCK.
No. 189,747.             Patented April 17, 1877.
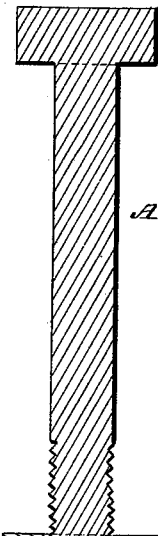
Fig. 1.
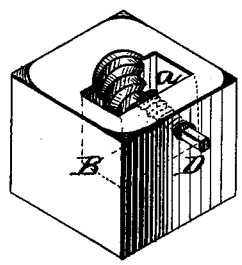
Fig. 3.
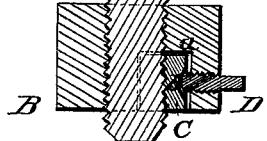
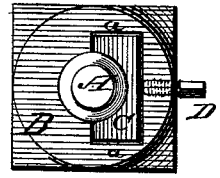
Fig. 2.
Fig. 4.
Witnesses:
P. C. Dieterich
Wm. J. Upperman
Inventor:
Jesse D. Kennard
Per C. H. Watson & Co. Attorneys.

UNITED STATES PATENT OFFICE.

JESSE D. KENNARD, OF NEW SHARON, IOWA, ASSIGNOR TO A. H. VICKERS AND T. C. VICKERS, OF SAME PLACE.

IMPROVEMENT IN NUT-LOCKS.

Specification forming part of Letters Patent No. 189,747, dated April 17, 1877; application filed February 8, 1877.

*To all whom it may concern:*

Be it known that I, J. D. KENNARD, of New Sharon, in the county of Mahaska and State of Iowa, have invented certain new and useful Improvements in Nut-Locks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a nut-lock, as will be hereinafter more fully set forth.

In the annexed drawing, which fully illustrates my invention, Figure 1 is a central vertical section of my invention. Fig. 2 is an end view of the same. Figs. 3 and 4 are detailed views of parts thereof.

A represents an ordinary bolt of any size, and B is the nut screwed on the end thereof.

The nut B is of ordinary form, and has a recess, $a$, formed in its outer face, which recess is about the depth of one-half the thickness of the nut, more or less, and it extends around one-half the central bolt-orifice in the nut. In the recess $a$ is placed a lock-piece, C, the inner side of which is concave and threaded to complete the screw-hole in the nut.

D represents a small screw-bolt, passed through the side of the nut from the inside of the recess $a$, and the inner end of this bolt bears in a recess, $b$, in the back of the lock C. The inner end of the bolt D is larger than the outer end; or, in other words, the bolt is made slightly tapering, so that any jar will not loosen said bolt, but, on the contrary, have a tendency to increase the pressure. The bolt D is first passed from the inside into its place, and the lock C is then put in the recess $a$, and the nut then screwed up on the bolt. When the nut is screwed up tightly, the bolt D is screwed inward, so as to bind the lock-piece C onto the bolt, thereby locking the nut firmly on the bolt. This locking device is applicable in any place, and for any purpose where it is desired to lock a nut on a bolt.

Having thus fully described my invention, what I claim as new, and desire to secure by Letters Patent, is—

1. The combination, with a bolt, A, of a nut, B, having an interior movable lock-piece, C, inserted from the outer face of the nut, and extending around one-half of the bolt, about one-half the thickness of the nut, and a screw-bolt, D, as and for the purposes herein set forth.

2. The combination of the nut B, provided with the recess $a$, the lock-piece C, having recess $b$, and the screw-bolt D, tapering smaller toward the head, substantially as and for the purposes herein set forth.

In testimony that I claim the foregoing as my own I affix my signature in presence of two witnesses.

JESSE D. KENNARD.

Witnesses:
T. C. VICKERS,
A. M. VICKERS.